United States Patent [19]

Sugimoto et al.

[11] Patent Number: 5,400,210
[45] Date of Patent: Mar. 21, 1995

[54] SUBSTRATE HAVING A BUILT-IN CAPACITOR AND PROCESS FOR PRODUCING THE SAME

[75] Inventors: Noriyasu Sugimoto; Yukihiro Kimura; Masaharu Seto, all of Aichi, Japan

[73] Assignee: NGK Spark Plug Co., Ltd., Aichi, Japan

[21] Appl. No.: 80,107

[22] Filed: Jun. 23, 1993

[30] Foreign Application Priority Data

Jul. 6, 1992 [JP] Japan .................... 4-203122

[51] Int. Cl.$^6$ .................... H01G 4/10; H01G 4/12
[52] U.S. Cl. .................... 361/321.5; 361/305; 361/321.4
[58] Field of Search ............ 361/321.4, 321.5, 311, 361/305; 501/88, 92; 29/25.42

[56] References Cited

U.S. PATENT DOCUMENTS

| 3,617,817 | 11/1971 | Kogasei-shi et al. | 317/234 R |
| 3,880,493 | 4/1975 | Lockhart, Jr. | 339/147 R |
| 4,408,256 | 10/1983 | Val | 361/403 |
| 4,485,182 | 11/1984 | Enomoto et al. | 501/88 |

FOREIGN PATENT DOCUMENTS

| 49-5392 | 2/1974 | Japan . | |
| 53-32233 | 9/1978 | Japan | H01L 23/00 |
| 60-22346 | 2/1985 | Japan | H01L 23/12 |
| 2-141471 | 5/1990 | Japan | C04B 35/46 |
| 3-146466 | 6/1991 | Japan | C04B 35/46 |

*Primary Examiner*—Bruce A. Reynolds
*Assistant Examiner*—Michael D. Switzer
*Attorney, Agent, or Firm*—Sughrue, Mion, Zinn, Macpeak & Seas

[57] ABSTRACT

In a substrate having built-in capacitor which is incorporated in and united with an insulator, the capacitor has a dielectric layer made of a silicon nitride-based ceramic containing silicon carbide in an amount of from 13 to 30% by weight.

9 Claims, 3 Drawing Sheets

SUBSTRATE HAVING A BUILT-IN CAPACITOR AND PROCESS FOR PRODUCING THE SAME

FIELD OF THE INVENTION

The present invention relates to a substrate having a built-in capacitor and a process for producing the same. The substrate is suited for use in fabricating, for example, a capacitor-IC package employing a combination of a capacitor and an integrated circuit (IC).

BACKGROUND OF THE INVENTION

If a capacitor can be built in an insulating substrate, the device as a whole can have a smaller volume than a capacitor made by mounting a chip capacitor on the surface of an insulating substrate and can therefore have a higher density and a smaller size. In addition, the insulating substrate on which an IC is to be mounted can have a lower inductance because a short wire is sufficient to connect the IC with the capacitor, so that noise, e.g., source noise and ground noise, can be greatly diminished. (Refer to JP-B-49-5392, JP-B-53-32233 which corresponds to U.S. Pat. No. 3,617,817, (the term "JP-B" used herein means an examined Japanese patent publications))

Barium titanate and alumina are well known as a conventional ceramic dielectric material and ceramic insulating material, respectively, and are widely used. (Refer to JP-A-60-22346, JP-A-2-141471, and JP-A-3-146466, (the term "JP-A" used herein means an unexamined published Japanese patent application))

However, common ceramic dielectric materials such as, e.g., barium titanate have thermal expansion coefficients of $8\times10^{-6}/°$ C. or higher, which are considerably high compared with that of semiconductor silicon (IC), and have tensile strengths of about 650 kg/cm$^2$, which are not satisfactorily high. Hence, although such common ceramic dielectric materials have high dielectric constants and function well when used in a capacitor, they are unsuited for use in combination with an insulating substrate on which an IC is to be mounted. On the other hand, alumina is disadvantageous in that it has a thermal expansion coefficient as high as $6\times10^{-6}$ to $8\times10^{-6}/°$C. and a dielectric constant as low as 10 to 14, although it has a high strength. Therefore, use of alumina as dielectric layers yields capacitors having a small capacity. Thus, there has been no known material which achieves all three properties of thermal expansion coefficient, tensile strength, and dielectric constant. (Refer to U.S. Pat. No. 3,880,493, and 4,408,256)

SUMMARY OF THE INVENTION

An object of the present invention is to provide a substrate having a built-in capacitor which substrate combines the three properties of a thermal expansion coefficient close to that of Si, a high tensile strength, and a high dielectric constant and can exhibit the functions of both a capacitor and an insulating substrate, and to provide a process for producing the above substrate.

The present invention provides a substrate comprising a built-in capacitor incorporated in and united with an insulator. The capacitor has a dielectric layer made of a silicon nitride (Si$_3$N$_4$)-based ceramic containing silicon carbide (SIC) in an amount of from 13 to 30% by weight, preferably 16 to 25% in consideration of high dielectric constant and insulation resistance.

A preferred process for producing this substrate having a built-in capacitor comprises the steps of:
(a) forming an insulator sheet comprising an insulating ceramic;
(b) preparing a mixture containing from 13 to 30% by weight (hereinafter all percents are by weight) of silicon carbide, with the remainder comprising silicon nitride and a sintering aid, and forming the mixture into a dielectric sheet;
(c) printing an electrode pattern on at least either of the insulator sheet and the dielectric sheet using a metallizing ink; and
(d) subsequently piling up at least one such insulator sheet and at least one such dielectric sheet and firing the assemblage to unite the sheets together.

DETAILED DESCRIPTION OF THE INVENTION

Figure 1:
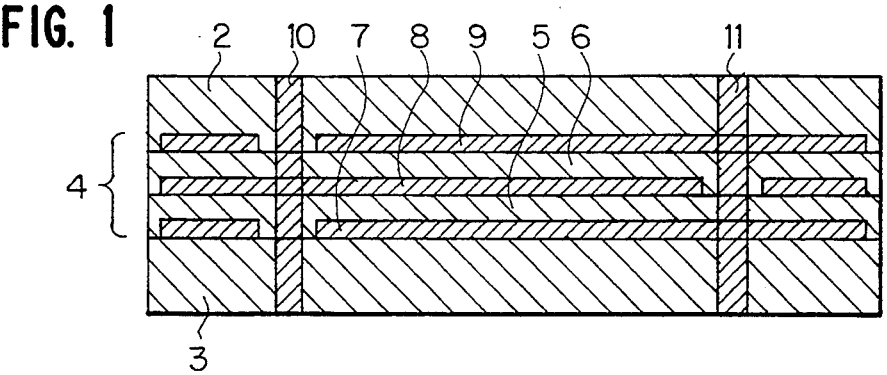
FIG. 1 is a vertical sectional view of one embodiment of the built-in capacitor-possessing substrate according to the present invention.

The silicon carbide (SIC) may be in either the $\alpha$ form or $\beta$ form which has a purity of 99% or higher and an average particle size of 0.5 to 4.0 $\mu$m. The silicon nitride (Si$_3$N$_4$)-based ceramic is a sinter containing a known sintering aid, such as alumina, yttria, or magnesia, in an amount not larger than that of the silicon carbide, and may be a SIALON. The silicon nitride has a purity of 99% or higher and an average particle size of 0.3 to 4.0 $\mu$m. The ceramics which constitute the insulator sheet preferably have a thermal expansion coefficient of preferably $2.35\times10^{-6}/°$C. to $3.35\times10^{-6}/°$C., which is close to $2.8\times10^{-6}$ to $2.9\times10^{-6}/°$C. of the sintered dielectric sheet. Examples of such an insulator material include one containing silicon nitride as the major component and a sintering aid and alumina as minor components, with the alumina amount being larger than that required for the function of a sintering aid, so as to regulate the thermal expansion coefficient.

The metallizing ink, for example, is a paste which comprises a high-melting metal such as W, Mo, or Mn and an organic binder. In particular, a W paste is preferred. This W paste reacts, during burning, with carbon in the organic binder contained in either the sheet(s) or the paste and thus is present as WC. It is desirable that the W is present as WC in order to prevent the W from reacting with silicon nitride to turn into W silicide, which has a high thermal expansion coefficient. It is also possible to use a carbide paste or a carbide-containing paste from the beginning.

The electrode pattern is not particularly limited in shape and is usually printed on almost the whole surface on the desired side of the sheet.

In the case where two or more insulator sheets and two or more dielectric sheets are used and a plurality of electrode patterns have been formed between the sheets, through-holes may be punched beforehand in the sheets, and the through-holes may be filled with a metallizing ink, whereby electrical connection can be established after firing.

In the built-in capacitor-containing substrate of the present invention, the silicon nitride contained in the ceramics constituting the capacitor mainly serves to enhance the mechanical strength, while the silicon carbide mainly serves to heighten the dielectric constant. Moreover, the thermal expansion coefficient of the layer as a whole can be close to that of Si due to an offset of thermal expansion between the silicon nitride and the silicon carbide. However, silicon carbide contents below 13% are undesirable in that the dielectric layer cannot have a dielectric constant sufficiently high to enable the layer to perform its function, while a content thereof higher than 30% undesirably results in insulation resistances below $10^8$ Ωm.

The present invention will be explained below in more detail with reference to the following example, but the invention is not construed as being limited thereto. Amounts are by weight unless otherwise indicated.

EXAMPLE

[Property evaluation of dielectric layer]

According to the compositions shown in Table 1, β-form silicon nitride having a purity of 99.9% and an average particle diameter of 0.9 μm was mixed with yttrium oxide having a purity of 99.9% and an average particle diameter of 2.1 μm and β-form silicon carbide having a purity of 99.9% and an average particle diameter of 0.9 μm. Each of the mixtures was homogenized in acetone by treating the mixture with a ball mill for 24 hours. The resulting mixtures were dried and granulated, and were then hot-pressed at a temperature of 1,700° C., a pressure of 200 kg/cm$^2$, and a pressing time of 30 minutes, to produce sinter Nos. 1 to 8 each having dimensions of 35 by 35 by 3.5 mm.

TABLE 1

| No. | Composition [wt %] | | | Remarks |
|---|---|---|---|---|
|  | Si$_3$N$_4$ | SiC | Y$_2$O$_3$ |  |
| 1 | 83.5 | 6.5 | 10.0 | Comparison |
| 2 | 77.7 | 13.0 | 10.0 | Invention |
| 3 | 70.0 | 20.0 | 10.0 | " |
| 4 | 60.0 | 30.0 | 10.0 | " |
| 5 | 60.0 | 40.0 | 10.0 | Comparison |
| 6 | 75.0 | 20.0 | 5.0 | Invention |
| 7 | 60.0 | 20.0 | 20.0 | " |
| 8 | 50.0 | 20.0 | 30.0 | Comparison |

Figure 3:
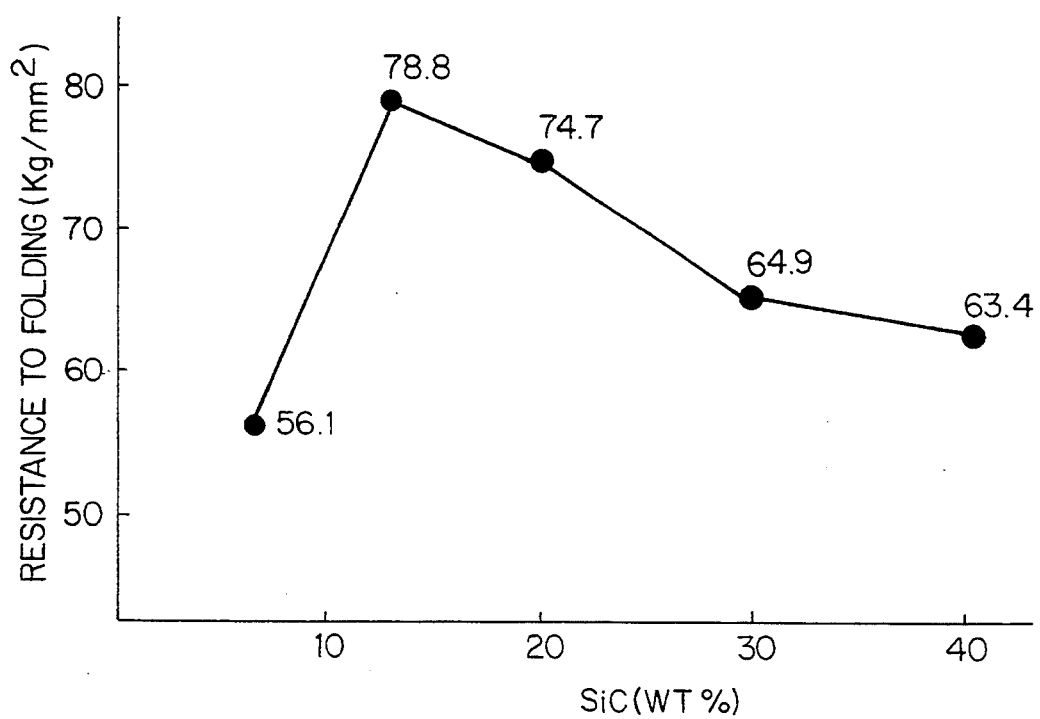
FIG. 3 is a graph showing the relationship between silicon carbide content in a dielectric layer and resistance to folding.
Figure 4:
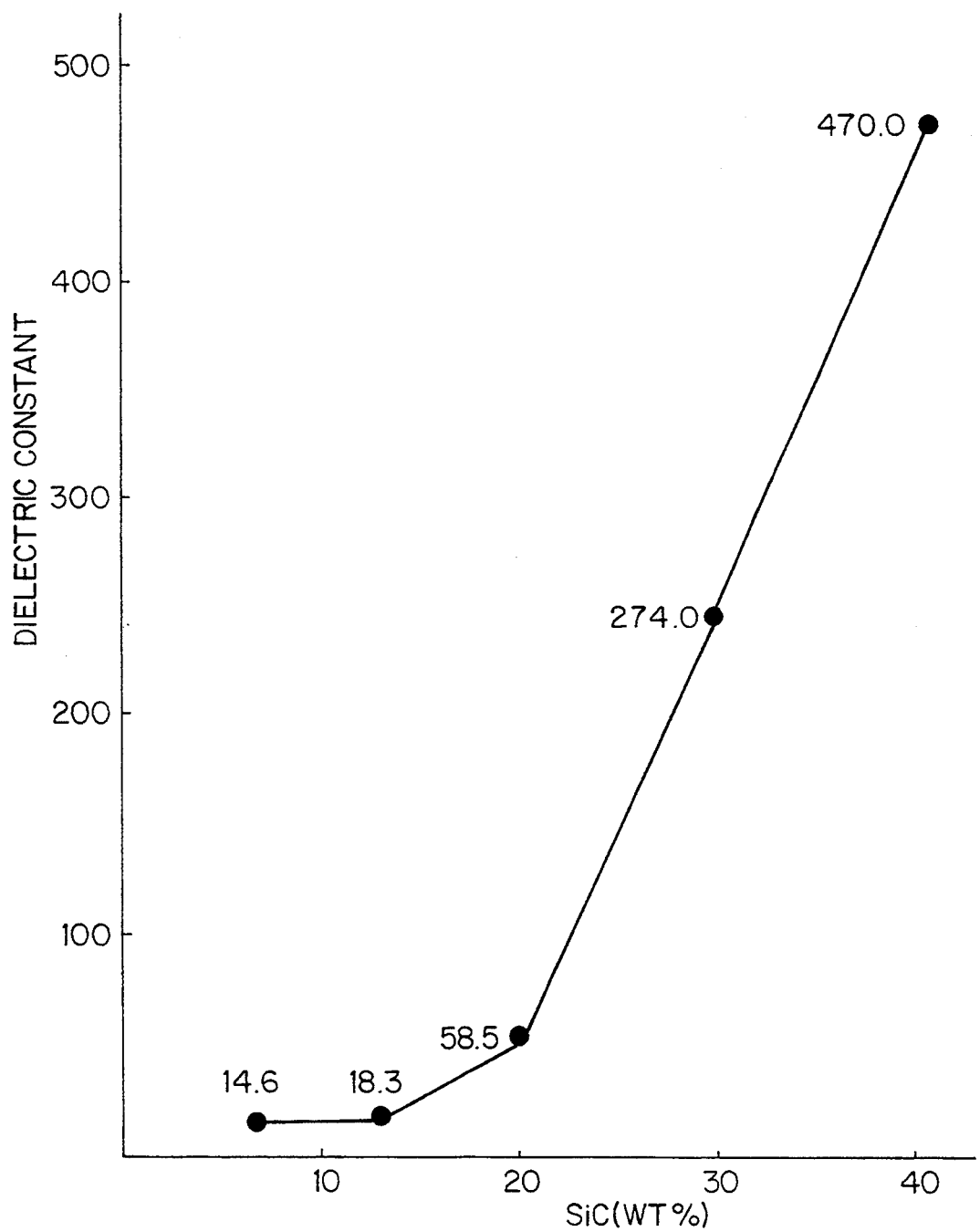
FIG. 4 is a graph showing the relationship between silicon carbide content in a dielectric layer and dielectric constant.

These sinters were examined for thermal expansion coefficient, flexural strength, dielectric constant, and insulation resistance. The results obtained are summarized in Table 2. The relationship between silicon carbide content and each of flexural strength and dielectric constant is shown in FIGS. 3 and 4, respectively. The flexural strength and the dielectric constant, in particular, varied considerably.

TABLE 2

| No. | Thermal expansion coefficient $10^{-6}$/°C. | Flexural strength kg/mm$^2$ | Dielectric constant | Insulation resistance Ωm | Remarks |
|---|---|---|---|---|---|
| 1 | 2.9 | 56.1 | 14.6 | $>10^{14}$ | Comparison |
| 2 | 2.8 | 78.7 | 18.3 | $>10^{13}$ | Invention |
| 3 | 2.8 | 74.7 | 58.5 | $>10^{11}$ | " |
| 4 | 2.9 | 64.9 | 274.0 | $>10^8$ | " |
| 5 | 2.8 | 63.4 | 470.0 | $>10^6$ | Comparison |
| 6 | 2.9 | 64.4 | 54.4 | $>10^{11}$ | Invention |
| 7 | 2.9 | 68.0 | 61.2 | $>10^{11}$ | " |

TABLE 2-continued

| No. | Thermal expansion coefficient $10^{-6}$/°C. | Flexural strength kg/mm$^2$ | Dielectric constant | Insulation resistance Ωm | Remarks |
|---|---|---|---|---|---|
| 8 | 3.0 | 39.4 | 64.1 | $>10^{11}$ | Comparison |

A comparison of sinter Nos. 1 to 5 in Table 2 shows the following. Sinter Nos. 2 to 4, which are within the range of the dielectric layer contained in the substrate of the present invention, had thermal expansion coefficients of $2.8 \times 10^{-6}$ to $2.9 \times 10^{-6}$/°C., which are close to that of silicon, and had flexural strengths as high as 64 to about 80 kg/mm$^2$ and dielectric constants as high as 18 or above. It is apparent that when such a sinter is united, as a built-in dielectric layer, with an insulator, the resulting insulator having the built-in dielectric layer functions as both an insulating substrate and a capacitor. In contrast, sinter No. 1 had a dielectric constant as low as 14.6 due to the insufficient silicon carbide content, while sinter No. 5 had too low an insulation resistance due to the too high silicon carbide content.

A comparison of sinter Nos. 3 and 6 to 8 shows that the amount of yttria as a sintering aid desirably is not larger than that of silicon carbide. This is because if the sintering aid is used in an excess amount, the strength properties characteristic of silicon nitride and silicon carbide are lost, and the strength of the sintering aid becomes predominant.

Figure 2:
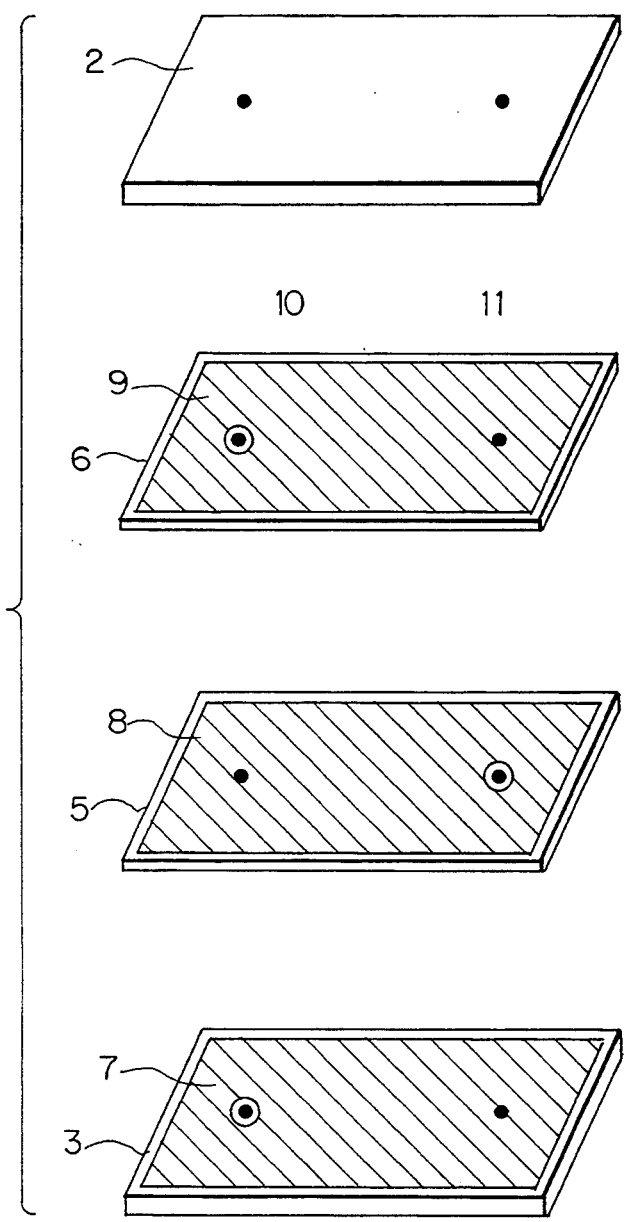
FIG. 2 is an enlarged slant view of the built-in capacitor-possessing substrate shown in FIG. 1.

Structure and production of one embodiment of the built-in capacitor-possessing substrate A sectional view and enlarged slant view of one embodiment of the built-in capacitor-possessing substrate according to the present invention are shown in FIGS. 1 and 2, respectively.

The built-in capacitor-possessing substrate 1 comprises insulator parts consisting of insulating substrates 2 and 3 and a capacitor part 4 sandwiched between the insulating substrates 2 and 3 and united with the insulator parts. The insulating substrates 2 and 3 each is made of a silicon nitride-yttria-alumina ceramic with a thickness of 0.2 mm and has an insulation resistance of about $10^{14}$ Ωcm or higher, a flexural strength of 40.5 kg/mm$^2$, and a thermal expansion coefficient of $3.1 \times 10^{-6}$/°C.

The capacitor part 4 is constituted by dielectric layers 5 and 6, electrodes 7, 8, and 9 between which each dielectric layer is sandwiched and which are covered with the insulating substrates, and throughholes 10 and 11 filling with electrical conductive material for connecting these electrodes to an external circuit. The dielectric layers 5 and 6 each is made of a silicon nitride-silicon carbide ceramic having a thickness of 24 μm and satisfying the specific compositional requirement as described hereinabove. The material of the electrodes 7, 8, and 9 is W, and the electrode area is 900 mm$^2$ and the electrode distance, which depends on the dielectric layer thickness, is 24 μm. The electrical conductive holes 10 and 11 are made of the same material as the electrodes and have a diameter of 0.25 mm.

The built-in capacitor-possessing substrate 1 was produced as follows.

First, 50% of β-form silicon nitride having a purity of 99.9% and an average particle diameter of 0.9 μm was mixed with 10% of yttrium oxide having a purity of 99.9% and an average particle diameter of 2.1 μm and 40% of aluminum oxide having a purity of 99.9% and an average particle diameter of 0.7 μm. Thereto were added 12 parts by weight of polyvinyl butyral as a binder and 95 parts by weight of toluene as a solvent, with respect to 100 parts by weight of powder material. The resulting mixture was homogenized and, from the mixture, two 0.4 mm-thick green sheets were formed with a doctor blade. These green sheets are referred to as insulator sheets.

On the other hand, 70% of β-form silicon nitride having a purity of 99.9% and an average particle diameter of 0.9 μm was mixed with 10% of yttrium oxide having a purity of 99.9% and an average particle diameter of 2.1 μm and 20% of β-form silicon carbide having a purity of 99.9% and an average particle diameter of 0.9 μm. Thereto were added the binder and the solvent in the same amount as disclosed above. The resulting mixture was homogenized and, from the mixture, two 50 μm-thick green sheets were formed with a doctor blade. These green sheets are referred to as dielectric sheets. Prior to the following operation, two through-holes having a diameter of 0.25 mm were punched in each of the insulator sheets and dielectric sheets.

An electrode pattern having a size of 30 by 30 mm was printed with a W paste on one side of one of the insulator sheets and on one side of each of the two dielectric sheets. The through-holes were filled with the same W paste. The above printing was conducted in such a manner that an unprinted part (each of the open circular parts in FIG. 2) was formed in the periphery of one of the through-holes in each green sheet so that the W paste in the through-hole was separated from the electrode pattern. The unprinted parts had an outer diameter of 0.5 mm.

The insulator sheet having a printed electrode pattern, the dielectric sheets, and the other insulator sheet having no printed electrode pattern were piled up with the electrode pattern sides facing upward. This assemblage was hot-pressed at a temperature of 1,700° C., a pressure of 200 kg/cm$^2$, and a pressing time of 30 minutes. Thus, the built-in capacitor-possessing substrate 1 was produced, in which the insulator sheets, the dielectric sheets, the electrode patterns, and the through-holes had turned into insulating substrates, dielectric layers, electrodes, and conductive holes, respectively. The W paste had turned into WC through reaction with residual carbon.

The electrical capacity of the built-in capacitor-possessing substrate 1 thus obtained was measured between the conductive holes 10 and 11, and was found to be 20 pF/mm$^2$. For purposes of comparison, a built-in capacitor-possessing comparative substrate was produced under the same conditions as the above except that the insulator and the dielectric layers were formed mainly from alumina and that a reducing atmosphere of an N$_2$+H$_2$ gaseous mixture containing H$_2$O was used as the burning atmosphere. The electrical capacity of this comparative substrate was measured, and was found to be 2 pF/mm$^2$. The above results show that the built-in capacitor-possessing substrate of the present invention has a capacity 10 times that of the alumina substrate having the same volume. Further, since the substrate of this embodiment is produced through firing by hot-pressing, the dielectric layers undergo a firing shrinkage in the thickness direction only, and the thickness thereof is reduced to about one-half the sheet thickness, so that a larger capacity is obtained.

The built-in capacitor-possessing substrate of the present invention was described above with respect to the capacitor-possessing part only, by means of an embodiment thereof. However, as in the case of ordinary built-in capacitor-possessing substrates, it is, of course, possible to form superposed insulating layers (of the Si$_3$N$_4$—Y$_2$O$_3$—Al$_2$O$_3$ type) on the upper or lower side of the capacitor part to make a signal wiring or the like have a multilayered structure. Moreover, a pad for mounting an IC or other element or a pin, lead, or the like for connection with a board may be formed on the substrate surface.

The substrate of the present invention provides the following effects. When a silicon chip is mounted on the substrate surface, it can be prevented from peeling off the substrate because the thermal expansion coefficient of the dielectric layer(s) accounting for a considerable part of the substrate volume is close to that of the semiconductor silicon. Furthermore, since the capacitor part has been incorporated in the inner part of the insulator part and united therewith, the device can be made to have a smaller size and a higher density. In addition, in the case of mounting a silicon chip on the substrate, the wire connecting the chip with the capacitor can have a short length and, hence, an inductance reduction can be attained.

While the invention has been described in detail and with reference to specific embodiments thereof, it will be apparent to one skilled in the art that various changes and modifications can be made therein without departing from the spirit and scope thereof.

What is claimed is:

1. A substrate comprising a built-in capacitor incorporated in and united with an insulator, said capacitor comprising a dielectric layer made of a silicon nitride-based ceramic containing silicon carbide in an amount of from 13 to 30% by weight.

2. The substrate as in claim 1, wherein an electrode electron pattern has been printed on at least either of the insulator sheet and the dielectric sheet with a metallizing ink.

3. The substrate as in claim 2, wherein the metallizing ink is tungsten paste.

4. The substrate as in claim 1, wherein the silicon carbide is α-form silicon carbide.

5. The substrate as in claim 1, wherein the silicon carbide is β-form silicon carbide.

6. A process for producing a substrate comprising a built-in capacitor which comprises the steps of:
   (a) forming an insulator sheet comprising an insulating ceramic;
   (b) preparing a mixture containing from 13 to 30% by weight of silicon carbide, with the remainder comprising silicon nitride and a sintering aid, and forming the mixture into a dielectric sheet;
   (c) printing an electrode pattern on at least either of the insulator sheet and the dielectric sheet using a metallizing ink; and
   (d) subsequently piling up at least one such insulator sheet and at least one such dielectric sheet and burning the assemblage to unite the sheets together.

7. The process for producing a substrate as in claim 6, wherein the metallizing ink is tungsten paste.

8. The process for producing a substrate as in claim 6, wherein the silicon carbide is α-form silicon carbide.

9. The process for producing a substrate as in claim 6, wherein the silicon carbide is β-form silicon carbide.

* * * * *